United States Patent Office 3,634,497
Patented Jan. 11, 1972

3,634,497
ACID RECONSTITUTION OF SPENT ALKALINE WASH SOLUTIONS USED IN REGENERATING NOBLE METAL UNSATURATED ESTER SYNTHESIS CATALYSTS
Clifford C. Budke, Cincinnati, Ohio, assignor to National Distillers and Chemical Corporation, New York, N.Y.
No Drawing. Filed Aug. 26, 1969, Ser. No. 853,191
Int. Cl. C07c 67/04; B01j 11/18
U.S. Cl. 260—497 A
10 Claims

ABSTRACT OF THE DISCLOSURE

Aqueous wash solutions, particularly the alkaline wash solutions used in the treatment and reactivation of catalysts for unsaturated ester production are regenerated and generally reconstituted for reuse by addition of an acid thereto to adjust the pH to the optimum level at which precipitation of impurities and decrease in color occurs. As an additional feature, after filtering, the alkaline solution obtained can be treated with activated carbon. Addition of alkali, with or without water dilution, as required, restores the wash solution to its original composition.

---

This invention relates to the regeneration of alkaline wash solutions by treatment with an acid to remove accumulated organic impurities and color. More particularly, an acid is added to the spent alkaline wash solution obtained from the reactivation of catalysts for unsaturated organic ester production to reduce the pH to a value where precipitation of organic impurities with resultant decrease in color of solution occurs. After the resulting solution is filtered, further purification can be achieved as required by passing the solution through activated carbon.

It is now well known that unsaturated organic esters such as vinyl acetate may be prepared from ethylene, oxygen and a carboxylic acid using palladium-containing catalysts. Moiseev et al., Doklady Akad. Nauk, S.S.S.R., vol. 133, pages 377–380 (1969) disclosed the preparation of vinyl acetate from ethylene, sodium acetate, liquid acetic acid, and a palladium catalyst. This work indicated that no vinyl acetate was obtained in the absence of sodium acetate in the reaction mixture. In U.S. Pat. No. 3,190,912 vinyl acetate, for example, was prepared in a vapor phase process by reacting ethylene, oxygen and acetic acid in the presence of a palladium catalyst. This patent also discloses the preparation of other esters by the use of higher olefins having up to 18 carbon atoms such as propylene, butene-1, isobutylene, hexene-1, isooctene, triisobutylene, butadiene, styrene, etc. and mixtures; and higher carboxylic acids including those having up to 8 carbon atoms such as propionic, isobutyric, benzoic, etc. Activation of the palladium catalyst with an alkali metal acetate has been practiced to obtain increased yields of the vinyl acetate. It has been found however that there is a serious decrease in the activity of the catalyst during the synthesis, which is undesirable in commercial operations. This decrease in catalyst activity is particularly disadvantageous in continuous or semi-continuous operations wherein it is desirable and even necessary to use the catalyst at high activity for relatively long periods of time.

The problems of both catalyst ability and active catalyst life have been recognized in this art, and there have been numerous proposals involving possible solutions. Recently there have been suggestions to carry out vinylation processes with palladium metal catalysts containing other metals such as gold, platinum, and the like. The amount of other metal in the catalyst may vary from about 5 to 80% preferably from about 5 to 20% by weight based on the total weight of the metals. The use of these palladium-containing catalysts has led to improvements in the rate of vinyl acetate production as well as in the catalyst life. Furthermore, the palladium metal-containing catalysts are generally used in conjunction with an inert carrier material such as alumina, silica, and the like. The catalysts are activated by adding thereto a minor amount of an alkali metal or alkaline earth metal organic acid salt or inorganic acid salt. Despite the use of these features and regardless of whether or not the catalyst is palladium metal or a combination of palladium and other metals, a marked decrease in catalyst activity occurs with time during the vinyl acetate synthesis.

To overcome this decreased catalyst activity, the catalyst bed can be soaked in an alkaline solution or the alkaline solution can be passed through the catalyst bed. The reactivation treatment is generally carried out under ambient temperature and pressure conditions. The effluent from the washings is usually quite dark, and the washing treatment is usually continued until the effluent is either substantially colorless or a very light straw color. When the treatment is completed, the catalyst bed is drained and the water contained therein evaporated under a stream of an inert gas such as nitrogen, argon, or the like. It is also possible to prewash the spent catalyst bed with deionized or distilled water prior to the use of the aforedescribed reactivation treatment. Heretofore, the alkaline wash solutions could only be employed for a limited number of catalyst treatments before being discarded because of the accumulation of organic materials therein.

One object of this invention is to recover and regenerate for reuse the alkaline wash solutions used in treating vinyl ester synthesis catalysts.

Another object of this invention is to adjust the acidity of used catalyst wash solutions to precipitate impurities and reduce color bodies thereby rendering the solutions available for reuse.

A further object of this invention is to recover and regenerate for reuse spent aqueous alkali acetate wash solutions, which result from treatment of palladium-containing catalysts employed in the vapor phase synthesis of vinyl acetate.

These and other objects will become readily apparent from the more detailed description of the invention presented below.

In accordance with the present invention it has been found possible to remove accumulated organic impurities from the alkaline wash solution and thereby regenerate its activating properties. The process of this invention is carried out by adding an acid to the spent aqueous alkali hydroxide-alkali acetate wash solution to reduce the acidity (pH) to a value at which maximum precipitation of organic impurities and resultant decrease in color of the solution occur. After filtering, further purification can be achieved by passing the solution through a column of activated carbon. It is also possible, by addition of alkali to raise the pH of the solution and subsequent dilution with water, to restore the wash solution to an alkali acetate and free alkali content equivalent to that of the original wash preparation.

The alkaline component of the original reactivation or wash solution is an alkali metal or alkaline earth metal organic acid salt, inorganic acid salt, hydroxide, or mixtures thereof. The alkali metal or alkaline earth metal salts of weak acids, both organic carboxylic acids having from 2 to 8 carbon atoms and inorganic acids, can be used, acetic acid being preferred. An alkali metal or alkaline earth metal hydroxide is mixed with the organic or inorganic acid salt in formulating the alkaline solution. Sodium, lithium and potassium salts or hydroxides are used as the alkaline constituents.

Although the invention is described with respect to regenerating spent washings of a palladium-containing catalyst, it is also possible to regenerate spent wash solutions which have been used on other Group VIII noble metals or platinum group metals such as platinum, ruthenium, rhodium, iridium, or mixtures thereof with each other or with palladium. The use of palladium metal alone or catalysts comprising a combination of palladium and platinum or gold are known to be particularly useful. These catalysts are often used in conjunction with an inert carrier. Preferred carriers are alumina or silica.

The reactivation by washing is commenced by stopping the vinylation synthesis reaction and adjusting the temperature and pressure conditions to those convenient for washing such as ambient conditions. The reactor may then be flooded with the alkaline solution and left to soak for about 15 to 60 minutes, preferably from about 15 to 30 minutes, draining off substantially all free liquid and repeating the treatment until the requisite amount of the required alkaline solution has been used or until the withdrawn liquid is substantially colorless or a very light straw or yellow color. A second possible procedure involves continuously or intermittently pumping the required alkaline solution through the catalyst bed until the appropriate conditions are achieved. The thus washed catalyst can be given a final wash with distilled or deionized water following treatment with the alkaline solution as desired.

Fresh alkaline wash preparations generally contain, for example, sodium acetate and/or potassium acetate within the range 1 to 10 percent by weight and the corresponding alkali metal hydroxide within the range 0.1 to 5.0 percent by weight. The solutions have a pH value within the range 11 to 13.

To effect the regeneration step an acid is added to the spent aqueous wash solution until the acidity is increased to a pH value within the range 5.5 to 9.0 and preferably 6.0 to 7.2, approximately 5.0 to 25.0 g. of acid per gallon of wash solution being required. This treatment can be performed at temperatures ranging from 5° C. to 200° C., preferably 20° C. to 80° C. The resulting solution is preferably allowed to stand for time periods ranging from a few minutes to several days to allow maximum coagulation of the precipitated impurities prior to separation by filtration or decantation.

Although the preferred acid for regenerating the wash solution is acetic acid and the invention will be more particularly delineated below with respect to the use of this acid in connection with the synthesis of vinyl acetate, it will be understood that other aliphatic carboxylic acids having up to eight carbon atoms per molecule as well as certain inorganic or mineral acids may be effectively utilized. Such acids include sulfuric, phosphoric, boric, oxalic, propionic, butyric, caprylic, etc. and mixtures thereof. For most purposes however the use of a halogen acid should be avoided to prevent possible reduction in activity of the metal catalyst, product contamination, or equipment corrosion. When esters other than vinyl acetate are being produced using higher carboxylic acids, as described above, the corresponding carboxylic acid is advantageously employed for regeneration. Nevertheless, the use of non-halogen mineral acids alone or in combination with carboxylic acids is also contemplated.

After filtration the corresponding desired alkali metal hydroxide is added, generally as a 10 to 50 percent aqueous solution, in an amount sufficient to react with any free acid present and to provide an excess in such amount that the solution when diluted with a prescribed amount of water will have a composition which corresponds to that of the original required catalyst wash preparation. The amount of alkali hydroxide and water needed may readily be ascertained from the composition of the original wash preparation and the amount of acid added to reduce the pH value as described hereinbefore. In practice, the amount of alkali metal hydroxide required can be determined by adding the alkali metal hydroxide to the solution until the pH value approximates that of the original wash preparation.

While the foregoing treatment removes the major portion of the eluted impurities from the spent wash solution, further improvements can be achieved by treating the solution with activated carbon, after the addition of the acid and prior to the addition of alkali metal hydroxide. Such treatment consists of passing the solution through a bed of activated carbon at a carbon to liquid volume ratio of about 1:32 or less to 1:1 or more, the exact conditions for optimum treatment depending on the concentration of the adsorbable contaminant and the contact time desired.

The acetic acid used for the wash solution regeneration should be of high purity and must be free of trace impurities, such as halogen anions, which have an adverse effect upon catalyst life and activity.

The activated carbon if used may vary in physical form from a fine powder of 100 mesh to a coarse pelleted form of approximately 4 to 10 mesh and encompass a surface area ranging from 300 to 2000 square meters per gram.

The sodium hydroxide or potassium hydroxide which is added as required to adjust the alkali and alkali acetate content of the purified wash solution should be of high purity and preferably free of any halogen anions such as chlorides which have an adverse effect upon catalyst life or activity and which can cause corrosion.

Although it is not understood just how the present process achieves its surprisingly effective results, the mechanism for the purification is believed to involve at least in part the precipitation of complex acidic impurities which gradually accumulate on and in the catalyst bed along with polyvinyl acetate and organic materials of an unknown nature. These materials are then removed from the catalyst bed during its reactivation with the alkali hydroxide-alkali acetate wash and are precipitated from the wash solution when the pH is decreased by the addition of acid. Any traces of alkali soluble alumina or silica present in the wash solution will also precipitate when the pH is decreased during the regeneration process and in this respect this material may function as a co-precipitant or a coagulating agent.

As an additional or alternate feature of the invention, it is possible to add activated carbon directly to the spent wash solution after pH adjustment with acid. Subsequent filtration of the precipitated solid impurities serves to remove the carbon and eliminate the need for further passage of the solution through a column of activated carbon at a later point in the process. It is also possible to use other adsorbents, including activated alumina and silica gel, for the removal of residual color and impurities from the spent wash solution over varying optimum pH ranges.

The invention will be more fully understood by reference to the following illustrative embodiments which are especially directed to the use of the present process in vinyl acetate synthesis operations.

EXAMPLE I 152 gms. of palladium metal-containing catalyst on alumina preactivated with potassium acetate was used in a synthesis reactor for the production of vinyl acetate from acetic acid, ethylene and oxygen in the vapor phase. After 485 hours of use over the temperature range of 125° to 130° C. and pressure of 35 p.s.i.g., the production rate of vinyl acetate (VA) decreased from 22 to 8 lbs. VA/lb.·Pd/Hr.

The catalyst bed was reactivated by passing 2800 ml. of an aqueous 5 percent solution of potassium acetate containing 0.5 percent potassium hydroxide through the catalyst bed. The first 1200 ml. of effluent solution which was dark brown in color was reserved. Further effluent became lighter in color, the last portion of solution being essentially colorless after passing through the bed. The bed was dried under a nitrogen stream at 130° C. and returned to catalyst service.

To the dark-brown spent wash solution having a pH of 12.1 and obtained in the manner described above, acetic acid was added at ambient temperature until the pH was decreased to a value of 6.2. Approximately 5 grams of acetic acid was required per liter of wash solution. A dark gelatinous appearing precipitate formed as the pH was decreased. After allowing several minutes for the precipitate to settle and coagulate, the solution was filtered through a rapid filter paper (Whatman No. 41–H). The filtrate, which was clear and light yellow in color, was recovered. A precipitated solids content of approximately 1.5 grams per liter of wash solution was obtained when the precipitate was washed with water and dried overnight at 70° C.

A portion of the clear filtrate was adjusted to pH 12.1 by addition of a small quantity of 45 percent KOH and an absorption scan made over the range 550 to 350 millimicrons. As no maxima were observed in the visible range, a wavelength of 400 millimicrons was selected for comparative absorbence measurement. The relative absorbence of the filtrate was 0.445 as compared to a relative absorbence of 4.33 for the original spent wash.

A 150 ml. sample of the remaining clear filtrate (pH 6.2) was passed through a 6 cm. x 1 cm. diameter bed containing 1.6 g. of commercial activated carbon, granular 20 x 50 mesh, at a flow rate of approximately 4 to 5 ml. per minute. The first 50 ml. of effluent from the carbon bed appeared colorless and had a relative absorbence of 0.030. Further effluent appeared pale yellow, the last 50 ml. having a relative absorbence of 0.060.

A 75 ml. sample of the original spent wash (pH=12.1) was passed through a 11 cm. x 1 cm. bed containing approximately 3.6 g. of the above activated carbon at a flow rate of 4 to 5 ml. per minute. Considerable coloration remained in the initial effluent. Relative absorbence values of the first and last 25 ml. fractions were 1.82 and 2.44, respectively.

EXAMPLE II 150 gms. of a palladium-containing catalyst on alumina preactivated with potassium acetate was used in a vinyl acetate synthesis reactor for the production of vinyl acetate from acetic acid, ethylene and oxygen in the vapor phase. After the catalyst had been on stream for 424 hours, it was washed with a 5% KOAc+0.5% KOH solution for regeneration. The washing was accomplished by pumping the wash solution into the reactor outlet and collecting the wash effluent from the reactor inlet. After 600 ml. of wash solution was used, with a 30 minute soaking of the catalyst after 500 ml., the wash effluent was clear.

Fifty ml. portions of a dark spent washing liquid (pH 11.9) such as is obtained as above described, were adjusted to various pH values by addition of acetic acid from a tared syringe. The weight of acetic acid required to reach each desired pH was recorded. After standing for approximately ten minutes to permit the dark gelatinous precipitates to coagulate, the solutions were filtered through rapid filter papers (Whatman No. 41–H) and the filtrates reserved. The relative absorbence value of each filtrate was measured at 400 millimicrons first directly and then after readjusting the pH of each filtrate to 11.9 by the addition of a small amount of 45 percent KOH. Results are summarized in the table below and indicate a minimum coloration to remain in the solution at a pH of approximately 6.6.

TABLE.—REMOVAL OF IMPURITIES FROM WASH LIQUID

| pH of sample | Acetic acid required, g./l. | Remarks | Filtrate relative absorbence pH as shown | Filtrate relative absorbence pH 11.9 |
|---|---|---|---|---|
| 11.9 (original wash) | 0 | No ppt | 5.57 | 5.57 |
| 10.3 | 0.83 | No ppt | | |
| 9.4 | 1.37 | Ppt | 1.27 | 1.40 |
| 8.4 | 1.58 | Ppt | 0.784 | 0.939 |
| 7.4 | 1.84 | Ppt | 0.554 | 0.704 |
| 6.6 | 2.52 | Ppt | 0.412 | 0.604 |
| 6.2 | 3.60 | Ppt | 0.429 | 0.694 |
| 5.6 | 10.25 | Ppt | 0.974 | 1.394 |

While particular embodiments of this invention are shown above, it will be understood that the invention is obviously subject to variations and modifications without departing from its broader aspects. Thus, in addition to its use in a vinyl acetate synthesis operation, the present invention may be employed in processes for the manufacture of higher unsaturated organic esters.

What is claimed is:

1. In a process for the production of an unsaturated organic ester which comprises reacting ethylene, oxygen and a carboxylic acid in the presence of a Group VIII noble metal-containing catalyst and periodically reactivating said catalyst by washing the same with an aqueous alkaline wash solution containing an alkali metal salt of an acid and an alkali metal hydroxide, the improvement which comprises:
   (a) periodically recovering the spent, impurity-containing aqueous alkaline wash solution having a pH of from 11 to 13;
   (b) admixing an aliphatic carboxylic acid or non-halogen mineral acid with the spent wash solution in an amount sufficient to increase the acidity of the resulting mixture to a pH value within the range of from 5.5 to 9.0 and concurrently precipitate the impurities therefrom;
   (c) separating the resulting precipitate from the thus treated wash solution; and
   (d) adding an alkali metal hydroxide to the wash solution to raise its pH to a value of from about 11 to 13 and thus regenerate the wash solution for further use in reactivating said catalyst.

2. The process of claim 1 wherein said catalyst is a palladium metal-containing catalyst.

3. The process of claim 1 wherein said alkali metal cation is sodium and/or potassium.

4. The process of claim 1 wherein the treated wash solution from step (c) is contacted prior to step (d) with an adsorbent to effect further purification.

5. The process of claim 4 wherein the adsorbent is activated carbon.

6. In a process for the production of vinyl acetate which comprises reacting ethylene, oxygen and acetic acid in the presence of a Group VIII noble metal-containing catalyst and periodically reactivating said catalyst by washing the same with an aqueous alkaline wash solution containing an alkali metal salt of an acid and an alkali metal hydroxide, the improvement which comprises:
   (a) periodically recovering the spent, impurity-containing aqueous alkaline wash solution having a pH of from about 11 to 13;
   (b) admixing acetic acid with the spent wash solution in an amount sufficient to increase the acidity of the resulting mixture to a pH value within the range of from 5.5 to 9.0;

(c) allowing sufficient time for the impurities to precipitate from the thus treated wash solution;

(d) separating the resulting precipitate from the wash solution; and (e) adding an alkali metal hydroxide to the wash solution to raise its pH to a value of from 11 to 13 and thus regenerate the wash solution for further use in reactivating said catalyst.

7. The process of claim 6 wherein the alkali metal cation is sodium and/or potassium.

8. The process of claim 6 wherein the treated wash solution obtained from step (d) is contacted prior to step (e) with an adsorbent to effect further purification.

9. The process of claim 8 wherein said adsorbent is activated carbon.

10. The process of claim 6 wherein said catalyst is a palladium metal-containing catalyst.

References Cited

UNITED STATES PATENTS

| 1,779,226 | 10/1930 | Bradley et al. | 23—49 |
| 2,861,039 | 11/1958 | Moser | 23—184 X |

FOREIGN PATENTS

| 1,107,495 | 3/1968 | Great Britain | 252—412 |
| 1,128,993 | 10/1968 | Great Britain | 252—412 |
| 1,148,583 | 4/1969 | Great Britain | 252—412 |

DANIEL E. WYMAN, Primary Examiner

P. E. KONOPKA, Assistant Examiner

U.S. Cl. X.R.

252—412, 413; 260—476